United States Patent
Withers et al.

(10) Patent No.: US 11,537,245 B2
(45) Date of Patent: Dec. 27, 2022

(54) DETECTION OF A PROTECTIVE COVER FILM ON A CAPACITIVE TOUCH SCREEN

(71) Applicant: QUALCOMM Incorporated, San Diego, CA (US)

(72) Inventors: Richard Stacy Withers, Sunnyvale, CA (US); David Johnson, Cupertino, CA (US); Hrishikesh Panchawagh, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/710,615

(22) Filed: Mar. 31, 2022

(65) Prior Publication Data

US 2022/0229504 A1 Jul. 21, 2022

Related U.S. Application Data

(63) Continuation of application No. 17/202,843, filed on Mar. 16, 2021, now Pat. No. 11,294,516, which is a continuation of application No. 16/899,174, filed on Jun. 11, 2020, now Pat. No. 10,969,913, which is a continuation of application No. 16/228,037, filed on Dec. 20, 2018, now Pat. No. 10,698,546.

(51) Int. Cl.
| | | |
|---|---|---|
| G06F 3/044 | (2006.01) | |
| G06F 3/041 | (2006.01) | |
| G06F 3/047 | (2006.01) | |

(52) U.S. Cl.
CPC .............. *G06F 3/044* (2013.01); *G06F 3/047* (2013.01); *G06F 3/0416* (2013.01)

(58) Field of Classification Search
CPC ........ G06F 3/044; G06F 3/0416; G06F 3/047; G06F 3/0418; G06F 3/014; G06F 3/0202
See application file for complete search history.

(56) References Cited

U.S. PATENT DOCUMENTS

| | | | |
|---|---|---|---|
| 10,698,546 B1 | 6/2020 | Withers et al. | |
| 10,969,913 B2 | 4/2021 | Withers et al. | |
| 2006/0120573 A1* | 6/2006 | Iori ...................... | G06V 10/993 |
| | | | 324/658 |
| 2014/0232691 A1* | 8/2014 | Lee ........................ | G06F 3/0443 |
| | | | 345/174 |
| 2016/0266717 A1* | 9/2016 | Oral ..................... | G06F 3/04186 |
| 2020/0341568 A1 | 10/2020 | Withers et al. | |
| 2021/0200350 A1 | 7/2021 | Withers et al. | |

* cited by examiner

*Primary Examiner* — Robert J Michaud
(74) *Attorney, Agent, or Firm* — Qualcomm Incorporated

(57) ABSTRACT

Methods, systems, and devices for detection of a protective cover film on a capacitive touch screen are described. A device may include a capacitive touch screen having a surface and a sensor grid underneath the surface having a set of conductive columns and a set of conductive rows. The device may measure a mutual capacitance between a subset of conductive columns or a subset of conductive rows associated with a sensor grid, and compare the measured mutual capacitance between the subset of conductive columns or the subset of conductive rows to a baseline mutual capacitance associated with the set of conductive columns and the set of conductive rows. According to the comparison, the device may determine a presence of a protective layer in contact with the surface of the capacitive touch screen, and adjust an operating characteristic of the sensor grid.

20 Claims, 11 Drawing Sheets

DETECTION OF A PROTECTIVE COVER FILM ON A CAPACITIVE TOUCH SCREEN

CROSS REFERENCE

The present Application for Patent is a Continuation of U.S. patent application Ser. No. 17/202,843 by WITHERS, et al., entitled "DETECTION OF A PROTECTIVE COVER FILM ON A CAPACITIVE TOUCH SCREEN" filed Mar. 16, 2021, which is a Continuation of U.S. patent application Ser. No. 16/899,174 by WITHERS, et al., entitled "DETECTION OF A PROTECTIVE COVER FILM ON A CAPACITIVE TOUCH SCREEN" filed Jun. 11, 2020, which is a Continuation of U.S. patent application Ser. No. 16/228,037 by WITHERS, et al., entitled "DETECTION OF A PROTECTIVE COVER FILM ON A CAPACITIVE TOUCH SCREEN," filed Dec. 20, 2018, assigned to the assignee hereof, and expressly incorporated herein.

BACKGROUND

Some example devices, such as smartphones, may have an interface allowing individuals to access features of the smartphone. An example of an interface may include, but is not limited to a resistance touch-based interface, a capacitance touch-based interface, a surface acoustic wave-based interface, an optical touch-based interface, an electromagnetic guidance-based interface, among others. Although generally durable, these interfaces are susceptible to unforeseen damage. Therefore, increasing demand for products protecting the interface has influenced the advances made to protective film manufacturing. In the example above, the interface may have a protective film (e.g., a transparent film) installed across it to reduce damage to the interface. While the protective film reduces damage to the interface in case of impact, the protective film may affect the functionality of one or more sensors positioned below the interface. For example, a protective film may defocus ultrasonic fingerprint sensors that may be located underneath the interface.

SUMMARY

The described techniques relate to improved methods, systems, devices, and apparatuses that support detection of a protective cover film on a capacitive touch screen. A device may determine a presence of the protective cover film by measuring a mutual capacitance. For example, a capacitance-based interface may include an array of conductive rows and an array of conductive columns. A change in the mutual capacitance between neighboring columns or neighboring rows can be measured to determine the presence of a protective cover film on the interface. In some examples, this change can be measured using a lookup table for baseline capacitance values, along with other information (e.g., temperature). In this way, the presence of the protective cover film can be detected without an external input (e.g., a finger touch by an individual). By determining the presence of the protective film, corrective measures can be applied to the functionality of one or more sensors positioned below the interface (e.g., an ultrasonic fingerprint sensor).

A method is described. The method may include measuring a mutual capacitance between a subset of conductive columns or a subset of conductive rows associated with a sensor grid, comparing the measured mutual capacitance between the subset of conductive columns or the subset of conductive rows to a baseline mutual capacitance associated with the set of conductive columns and the set of conductive rows, determining a presence of a protective layer in contact with a surface of the capacitive touch screen based on the comparison, and adjusting an operating characteristic of the sensor grid based on the presence of the protective layer in contact with the surface of the capacitive touch screen.

An apparatus is described. The apparatus may include a processor, a capacitive touch screen in electronic communication with the processor, the capacitive touch screen comprising a surface and a sensor grid underneath the surface having a set of conductive columns and a set of conductive rows, memory in electronic communication with the processor, and instructions stored in the memory. The instructions may be executable by the processor to cause the apparatus to measure a mutual capacitance between a subset of conductive columns or a subset of conductive rows associated with the sensor grid, compare the measured mutual capacitance between the subset of conductive columns or the subset of conductive rows to a baseline mutual capacitance associated with the set of conductive columns and the set of conductive rows, determine a presence of a protective layer in contact with the surface of the capacitive touch screen based on the comparison, and adjust an operating characteristic of the sensor grid based on the presence of the protective layer in contact with the surface of the capacitive touch screen.

Another apparatus is described. The apparatus may include means for measuring a mutual capacitance between a subset of conductive columns or a subset of conductive rows associated with a sensor grid, comparing the measured mutual capacitance between the subset of conductive columns or the subset of conductive rows to a baseline mutual capacitance associated with the set of conductive columns and the set of conductive rows, determining a presence of a protective layer in contact with a surface of the capacitive touch screen based on the comparison, and adjusting an operating characteristic of the sensor grid based on the presence of the protective layer in contact with the surface of the capacitive touch screen.

A non-transitory computer-readable medium storing code is described. The code may include instructions executable by a processor to measure a mutual capacitance between a subset of conductive columns or a subset of conductive rows associated with a sensor grid, compare the measured mutual capacitance between the subset of conductive columns or the subset of conductive rows to a baseline mutual capacitance associated with the set of conductive columns and the set of conductive rows, determine a presence of a protective layer in contact with a surface of the capacitive touch screen based on the comparison, and adjust an operating characteristic of the sensor grid based on the presence of the protective layer in contact with the surface of the capacitive touch screen.

In some examples of the method, apparatuses, and non-transitory computer-readable medium described herein, adjusting the operating characteristic of the sensor grid may include operations, features, means, or instructions for identifying a set of calibration values corresponding to the protective layer, and adjusting a sensitivity or linearity of the sensor grid based on the set of calibration values.

Some examples of the method, apparatuses, and non-transitory computer-readable medium described herein may further include operations, features, means, or instructions for mapping the measured mutual capacitance to a first lookup entry in a set of lookup entries, where the set of lookup entries includes a set of classes of protective layers and a mutual capacitance corresponding to each class of protective layers, and identifying a class of the protective layer based on the mapping, where adjusting the operating characteristic of the sensor grid may be further based on the class of the protective layer.

Some examples of the method, apparatuses, and non-transitory computer-readable medium described herein may further include operations, features, means, or instructions for mapping the class of the protective layer to a second lookup entry in the set of lookup entries, where the set of lookup entries includes a set of calibration values to compensate for a difference between the measured mutual capacitance and the baseline mutual capacitance, and calibrating the sensor grid based on the set of calibration values, where adjusting the operating characteristic of the sensor grid may be further based on the calibration.

Some examples of the method, apparatuses, and non-transitory computer-readable medium described herein may further include operations, features, means, or instructions for mapping the measured mutual capacitance to a second lookup entry in the set of lookup entries, where the set of lookup entries includes a layer thickness corresponding to the mutual capacitance of each class of protective layers, and estimating a layer thickness of the protective layer based on the mapping, where identifying the class of the protective layer may be further based on the estimated thickness of the protective layer.

Some examples of the method, apparatuses, and non-transitory computer-readable medium described herein may further include operations, features, means, or instructions for mapping the estimated layer thickness of the protective layer to a third lookup entry in the set of lookup entries, where the set of lookup entries further includes a set of calibration values to compensate for a difference between the measured mutual capacitance and the baseline mutual capacitance, and calibrating the sensor grid based on the set of calibration values, where adjusting the operating characteristic of the sensor grid may be further based on the calibration.

Some examples of the method, apparatuses, and non-transitory computer-readable medium described herein may further include operations, features, means, or instructions for determining an ambient temperature associated with the measured mutual capacitance between the subset of conductive columns or the subset of conductive rows, and comparing the ambient temperature associated with the measured mutual capacitance to a baseline temperature associated with the baseline mutual capacitance, where adjusting the operating characteristic of the sensor grid may be further based on the comparison between the ambient temperature associated with the measured mutual capacitance and the baseline temperature associated with the baseline mutual capacitance.

Some examples of the method, apparatuses, and non-transitory computer-readable medium described herein may further include operations, features, means, or instructions for determining a mutual capacitance offset value based on the comparison, and mapping the mutual capacitance offset value to a second lookup entry in the set of lookup entries, where the set of lookup entries includes a set of calibration values to compensate for the mutual capacitance offset value associated with a difference between the ambient temperature associated with the measured mutual capacitance and the baseline temperature associated with the baseline mutual capacitance, where adjusting the operating characteristic of the sensor grid may be further based on the mutual capacitance offset value.

Some examples of the method, apparatuses, and non-transitory computer-readable medium described herein may further include operations, features, means, or instructions for calibrating the sensor grid based on the set of calibration values, where adjusting the operating characteristic of the sensor grid may be further based on the calibration.

Some examples of the method, apparatuses, and non-transitory computer-readable medium described herein may further include operations, features, means, or instructions for determining a presence of a second protective layer in contact with the surface of the capacitive touch screen based on the comparison, where adjusting the operating characteristic of the sensor grid may be further based on the presence of the protective layer and the second protective layer in contact with the surface of the capacitive touch screen.

In some examples of the method, apparatuses, and non-transitory computer-readable medium described herein, the protective layer may be in contact with a first region of the surface of the capacitive touch screen and the second protective layer may be in contact with a second region of the surface of the capacitive touch screen different from the first region.

Some examples of the method, apparatuses, and non-transitory computer-readable medium described herein may further include operations, features, means, or instructions for measuring a touch capacitance associated with a touchpoint in contact with the surface of the capacitive touch screen, adding the touch capacitance to the measured mutual capacitance, and comparing the measured mutual capacitance including the touch capacitance to the baseline mutual capacitance, where determining the presence of the protective layer in contact with the surface of the capacitive touch screen may be further based on the comparison of the measured mutual capacitance including the touch capacitance to the baseline mutual capacitance.

In some examples of the method, apparatuses, and non-transitory computer-readable medium described herein, the protective layer includes at least one of a polyimide, a polyethylene, a terephthalate, a polyethylene terephthalate polyester, a polyurethane, or a pressure sensitive adhesive, or a combination thereof.

In some examples of the method, apparatuses, and non-transitory computer-readable medium described herein, the baseline mutual capacitance may be a manufacturing defined mutual capacitance associated with the set of conductive columns and the set of conductive rows.

DETAILED DESCRIPTION

A device, for example, such as smartphones, may have an interface allowing individuals to access features of the smartphone. The interface may include, but is not limited to a resistance touch-based interface, a capacitance touch-based interface, a surface acoustic wave-based interface, an optical touch-based interface, an electromagnetic guidance-based interface, among others. In some examples, the device may have one or more protective cover films (e.g., a transparent film) installed across it to reduce possible damage to the interface. Although the one or more protective cover films may reduce damage to the interface, these films may disturb the functionality of one or more sensors positioned below the interface.

To appreciate the benefits of the present disclosure and address the shortcoming of standing techniques, the device may support detection of one or more protective cover films present on an interface of the device, and adjust an operating characteristic of the one or more sensors positioned below the interface. For example, the device may measure a mutual capacitance between a subset of conductive columns or a subset of conductive rows associated with the one or more sensors underneath the interface, and compare the measured mutual capacitance between the subset of conductive columns or the subset of conductive rows to a baseline mutual capacitance (e.g., a manufacturing defined mutual capacitance) associated with the set of conductive columns and the set of conductive rows. As a result, the device determine a presence of a protective layer in contact with the interface, and adjust a sensitivity or linearity of the one or more sensors.

Therefore, the techniques described herein may provide improvements in detection of one or more protective cover films on the interface associated with the device. Furthermore, the techniques described herein may provide benefits and enhancements to the operation of the device (e.g., improved sensitivity or linearity of the one or more sensors associated with and underneath the interface). For example, by supporting effective techniques for detection of one or more protective cover films, the operational characteristics, such as power consumption, processor utilization, and memory usage of the device may be reduced. The techniques described herein may also provide efficiency to the device by reducing latency associated with processes related to the detection of one or more protective cover films.

Aspects of the disclosure are initially described in the context of a wireless communications system. Aspects of the disclosure are further illustrated by and described with reference to a device and methods that relate to detection of a protective cover film on a capacitive touch screen. Aspects of the disclosure are further illustrated by and described with reference to apparatus diagrams, system diagrams, and flowcharts that relate to detection of a protective cover film on a capacitive touch screen.

Figure 1:
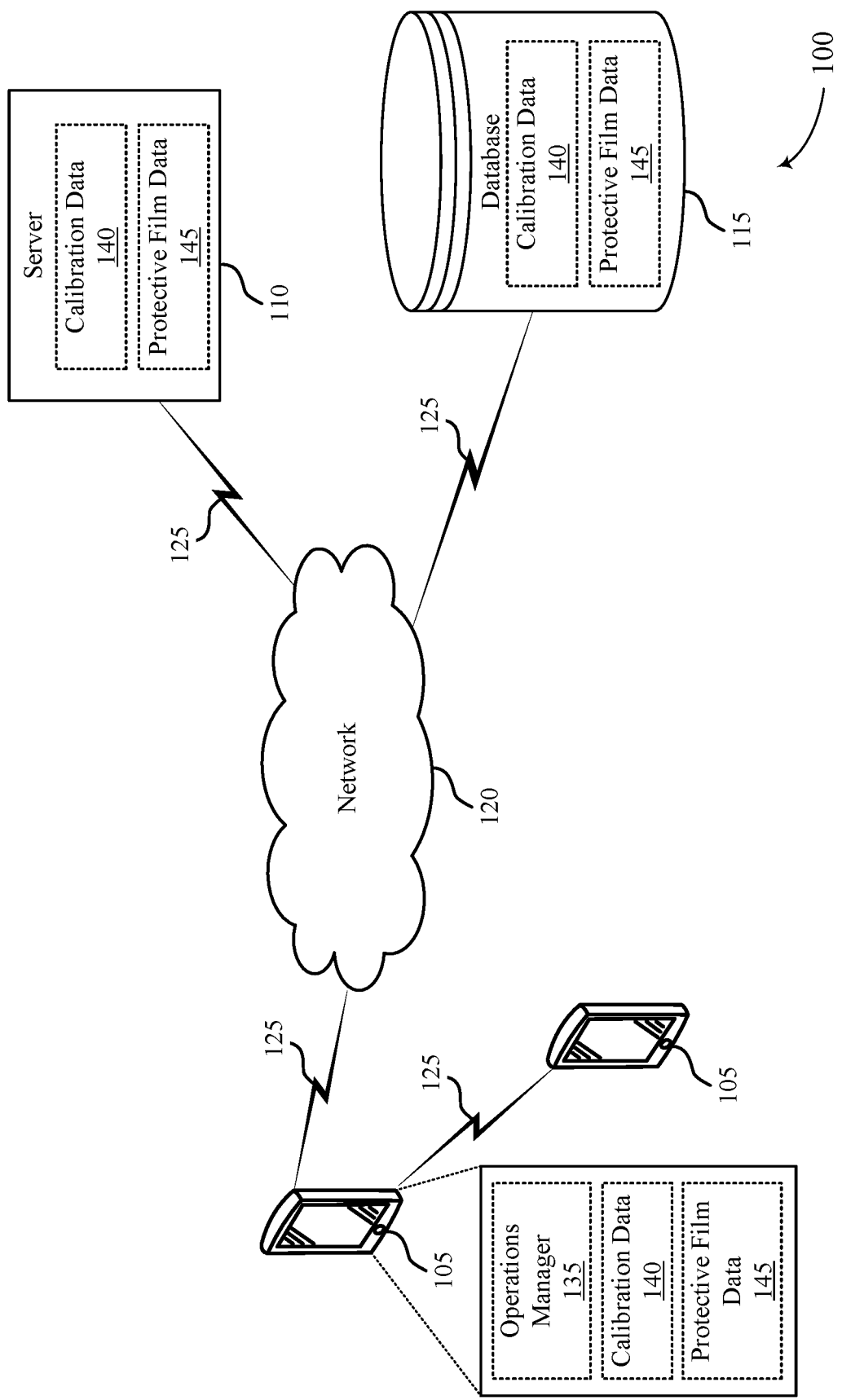
FIG. 1 illustrates an example of a system that supports detection of a protective cover film on a capacitive touch screen in accordance with aspects of the present disclosure.

FIG. 1 illustrates an example of a system 100 that supports detection of a protective cover film on a capacitive touch screen in accordance with aspects of the present disclosure. The system 100 may include devices 105, a server 110, and a database 115. Although, the system 100 illustrates two devices 105, a single server 110, a single database 115, and a single network 120, the present disclosure applies to any system architecture having one or more devices 105, servers 110, databases 115, and networks 120. The devices 105, the server 110, and the database 115 may communicate with each other and exchange information that supports detection of a protective cover film on an interface of the devices 105, via network 120 using communications links 125. In some cases, a portion or all of the techniques described herein supporting detection of a protective cover film on an interface may be performed on the devices 105 or the server 110, or both.

The devices 105 may be a cellular phone, a smartphone, a personal digital assistant (PDA), a wireless communication device, a handheld device, a tablet computer, a laptop computer, a cordless phone, a display device (e.g., monitors), and/or the like that supports various types of communication and functional features related to detection of a protective cover film on an interface for example, transmitting, receiving, and storing calibration data 140, protective film data 145, among other data. The devices 105 may, additionally or alternatively, be referred to by those skilled in the art as a user equipment (UE), a user device, a smartphone, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. In some cases, the devices 105 may also be able to communicate directly with another device (e.g., using a peer-to-peer (P2P) or device-to-device (D2D) protocol). For example, the devices 105 may be able to receive from or transmit to another device 105 variety of information, such as instructions or commands (e.g., calibration data 140, protective film data 145).

The devices 105 may include an operations manager 135. While, the system 100 illustrates only one device 105 including the operations manager 135, it may be an optional feature for the devices 105. In some examples, the devices 105 may have an application that may receive information (e.g., download) from the server 110, database 115 or another device 115, or transmit (e.g., upload) calibration data 140, protective film data 145, among other data to the server 110, the database 115, or to another device 115 via using communications links 125. The operations manager 135 may measure a mutual capacitance between a subset of conductive columns or a subset of conductive rows associated with a sensor grid underneath a surface of an interface having a set of conductive columns and a set of conductive rows. The interface may include, but is not limited to a resistance touch-based interface, a capacitance touch-based interface, a surface acoustic wave-based interface, an optical touch-based interface, an electromagnetic guidance-based interface, among others. The operations manager 135 may compare the measured mutual capacitance between the subset of conductive columns or the subset of conductive rows to a baseline mutual capacitance associated with the set of conductive columns and the set of conductive rows, and determine a presence of a protective layer in contact with the surface of the interface based at least in part on the comparison. The protective layer may include at least one of a polyimide, a polyethylene, a terephthalate, a polyethylene terephthalate polyester, a polyurethane, or a pressure sensitive adhesive, or a combination thereof. As a result, the operations manager 135 may adjust an operating characteristic of the sensor grid. The operating characteristics of the sensor grid may include, but are not limited to, a sensitivity of the sensor grid, a range of the sensor grid, a resolution of the sensor grid, or a linearity of the sensor grid, or any combination thereof. Therefore, the operations manager 135 may adjust a sensitivity, a range, a resolution, an accuracy, or a linearity of the sensor grid. In some examples, the operations manager 135 may adjust the operating characteristics of the sensor grid including the sensitivity of the sensor grid, the range of the sensor grid, the resolution of the sensor grid, or the linearity of the sensor grid, or any combination thereof via an application running on the device 105. For example, the operations manager 135 may adjust an operating characteristics of the sensor grid using a lookup table that includes a set of operating characteristics values for different protective layers, as well as thickness associated with the corresponding protective layers.

A sensitivity of the sensor grid may be defined as a minimum input of a physical parameter (e.g., a mutual capacitance, a touch capacitance) that creates a detectable output range. In some examples, the sensitivity may be defined as an input parameter change required to produce a standardized output change. That is, a mutual capacitance change for a given change in input parameter. The operations manager 135 may adjust a sensitivity of the sensor grid based on the protective layer in contact with the surface of the interface. The operations manager 135 may consult a lookup table that includes a set of sensitivity values for different protective layers, as well as thickness associated with the corresponding protective layers. Therefore, the operations manager 135 may adjust the sensitivity of the sensor grid according to the protective layer, as well as the thickness associated with the corresponding protective layer. For example, the operations manager 135 may correlate the protective layer to a sensitivity value for the sensor grid, and adjust the sensitivity of the sensor grid based on the sensitivity value.

A range of the sensor grid may be defined as the maximum and minimum values of applied parameters (e.g., mutual capacitances) that can be measured. The operations manager 135 may adjust a range of the sensor grid based on the protective layer in contact with the surface of the interface. The operations manager 135 may consult a lookup table that includes a set of range values for different protective layers, as well as thickness associated with the corresponding protective layers. Therefore, the operations manager 135 may adjust the range of the sensor grid according to the protective layer, as well as the thickness associated with the corresponding protective layer. For example, the operations manager 135 may correlate the protective layer to a range value for the sensor grid, and adjust the range of the sensor grid based on the range value.

A resolution of the sensor grid may be defined as the smallest detectable incremental change of an input parameter (e.g., mutual capacitance, touch capacitance) that can be detected in an output signal. The operations manager 135 may adjust a resolution of the sensor grid based on the protective layer in contact with the surface of the interface. The operations manager 135 may consult a lookup table that includes a set of resolution values for different protective layers, as well as thickness associated with the corresponding protective layers. Therefore, the operations manager 135 may adjust the resolution of the sensor grid according to the protective layer, as well as the thickness associated with the corresponding protective layer. For example, the operations manager 135 may correlate the protective layer to a resolution value for the sensor grid, and adjust the resolution of the sensor grid based on the resolution value.

A linearity of the sensor grid may be defined as an expression of the extent to which an actual measured curve of the sensor grid departs from the ideal curve. The operations manager 135 may adjust a linearity of the sensor grid based on the protective layer in contact with the surface of the interface. The operations manager 135 may consult a lookup table that includes a set of linearity values for different protective layers, as well as thickness associated with the corresponding protective layers. Therefore, the operations manager 135 may adjust the linearity of the sensor grid according to the protective layer, as well as the thickness associated with the corresponding protective layer. For example, the operations manager 135 may correlate the protective layer to a linearity value for the sensor grid, and adjust the linearity of the sensor grid based on the linearity value. That is, the operations manager 135 may adjust the extent to which the actual measured curve of the sensor grid departs from the ideal curve.

The operations manager 135 may be part of a general-purpose processor, a digital signal processor (DSP), a central processing unit (CPU), a graphics processing unit (GPU), a microcontroller, an application-specific integrated circuit (ASIC), a field-programmable gate array (FPGA), a discrete gate or transistor logic component, a discrete hardware component, or any combination thereof) or other programmable logic device, discrete gate or transistor logic, discrete hardware components, or any combination thereof designed to perform the functions described in the present disclosure, and/or the like. For example, the operations manager 135 may process data (e.g., calibration data 140, protective film data 145) from and/or write data (e.g., calibration data 140, protective film data 145) to a local memory of the device 105 or to the database 115.

The server 110 may be a data server, a cloud server, a proxy server, a web server, an application server, a communications server, a home server, a mobile server, or any combination thereof. The server 110 may optionally store calibration data 140, protective film data 145. The calibration data 140 or the protective film data 145, or both may allow the devices 105 to determine a presence of a protective layer in contact with a surface of an interface of the devices 105 (e.g., a capacitive touch screen), which the devices 105 may use to adjust an operating characteristic of a sensor grid underneath the surface of the interface having a set of conductive columns and a set of conductive rows. The server 110 may also transmit to the devices 105 a variety of information, such as instructions or commands, for example such as calibration data 140, protective film data 145, among other data.

The database 115 may store a variety of information, such as instructions or commands (e.g., calibration data 140, protective film data 145, among other data). For example, the database 115 may optionally store calibration data 140, protective film data 145, among other data. The devices 105 may retrieve the stored data from the database 115 via the network 120 using communication links 125. In some examples, the database 115 may be a relational database (e.g., a relational database management system (RDBMS) or a Structured Query Language (SQL) database), a non-relational database, a network database, an object-oriented database, among others that stores the variety of information, such as instructions or commands (e.g., calibration information).

The network 120 may provide encryption, access authorization, tracking, Internet Protocol (IP) connectivity, and other access, computation, modification, and/or functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G) for example), etc. Network 120 may include the Internet.

The communications links 125 shown in the system 100 may include uplink transmissions from the device 105 to the server 110 and the database 115, and/or downlink transmissions, from the server 110 and the database 115 to the device 105. The wireless links 125 may transmit bidirectional communications and/or unidirectional communications. In some examples, the communication links 125 may be a wired connection or a wireless connection, or both. For example, the communications links 125 may include one or more connections, including but not limited to, Wi-Fi, Bluetooth, Bluetooth low-energy (BLE), cellular, Z-WAVE, 802.11, peer-to-peer, LAN, wireless local area network (WLAN), Ethernet, FireWire, fiber optic, and/or other connection types related to wireless communication systems.

The techniques described herein may provide improvements in detection of a protective cover film on a surface of an interface (e.g., a resistance touch-based interface, a capacitance touch-based interface, a surface acoustic wave-based interface, an optical touch-based interface, an electromagnetic guidance-based interface, among others). Furthermore, the techniques described herein may provide benefits and enhancements to the operation of the devices 105 (e.g., improved sensitivity or linearity of a sensor grid associated with the interface). By supporting efficient and effective techniques for detection of a protective cover film, the operational characteristics, such as power consumption, processor utilization (e.g., CPU processing utilization), and memory usage of the devices 105 may be reduced. For example, by use of one or more lookup tables, the device 105 may identify calibration values to improve the operability of the sensor grid associated with the device 105 in an efficient manner; for example, rather than having to calculate the calibration values itself. The techniques described herein may also provide efficiency to the devices 105 by reducing latency associated with processes related to the detection of a protective cover film.

Figure 2:
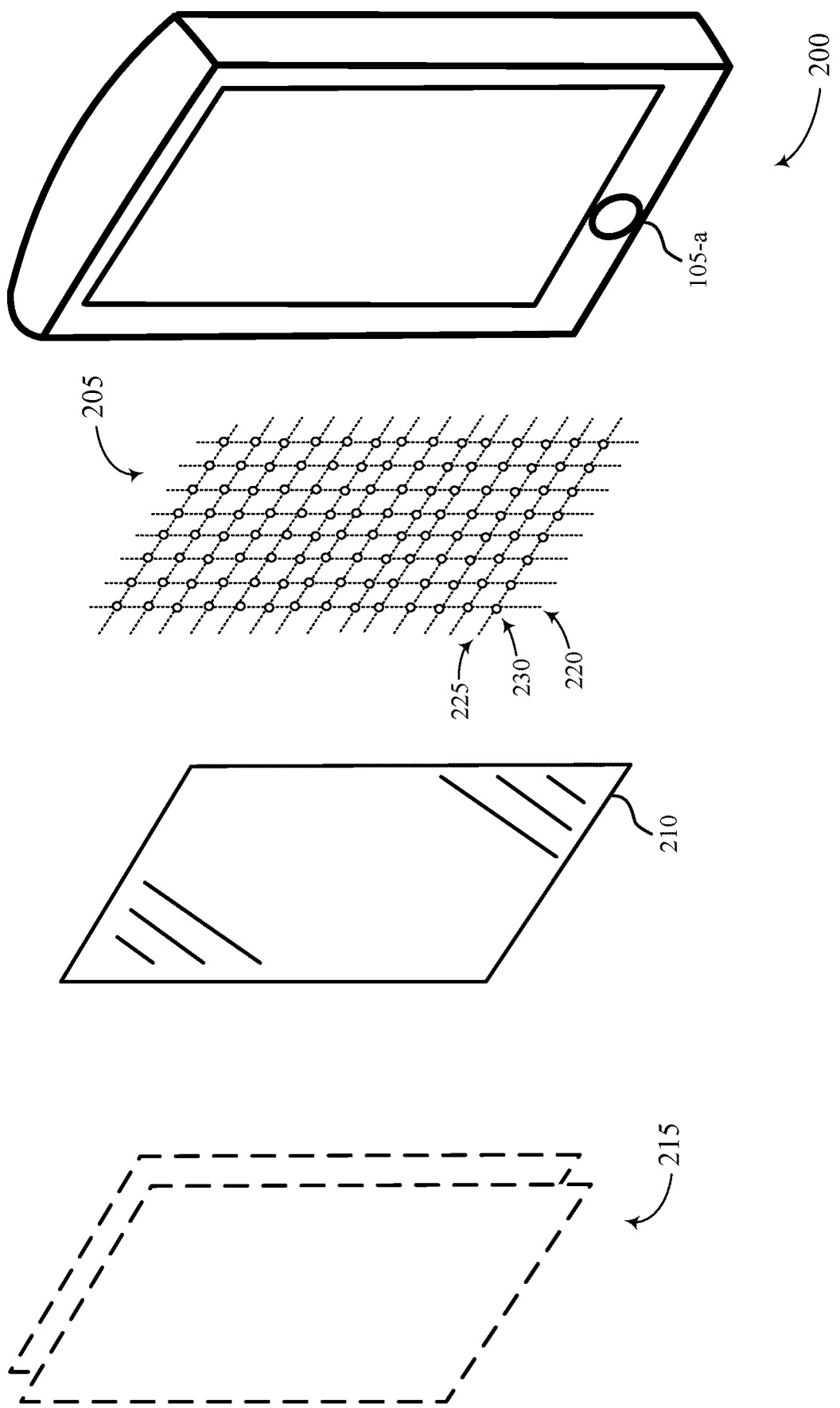
FIG. 2 illustrates an example of a block diagram including a device that supports detection of a protective cover film on a capacitive touch screen in accordance with aspects of the present disclosure.

FIG. 2 illustrates an example of a block diagram 200 including a device 105-a that supports detection of a protective cover film on a capacitive touch screen in accordance with aspects of the present disclosure. The device 105-a may be examples of the corresponding devices 105 described with reference to FIG. 1. The device 105-a may include an interface 210, which may include, but is not limited to a capacitance touch-based interface. Alternatively, the interface 210 may include, but is not limited to, a resistance touch-based interface, a capacitance touch-based interface, a surface acoustic wave-based interface, an optical touch-based interface, an electromagnetic guidance-based interface, among others. In some examples, the device 105-a may implement aspects of the system 100. For example, while generally robust, the interface 210 may be susceptible to unforeseen damage. Therefore, increasing demand for products protecting the interface 210 has influenced the advances made to protective film manufacturing. In the example of FIG. 2, the interface 210 may have one or more protective cover films 215 (e.g., a transparent film) installed across it to reduce damage to the interface 210 of the device 105-a. Although the one or more protective cover films 215 may reduce damage to the interface 210, the one or more protective cover films 215 may disturb the functionality of a sensor grid 205 (e.g., having one or more sensors) positioned below the interface 210.

The sensor grid 205 may have a certain geometrical grid pattern that may have an effect on spatial accuracy and noise resistance of touch sensing related to the interface 210. In capacitance touch-based interface, the sensor grid 205 may include a set of conductive columns 220 and a set of conductive rows 225. In some examples, the set of conductive columns 220 or the set of conductive rows 225, or both may be formed from an electrode having same or different characteristics. In an example, the set of conductive columns 220 may be formed of a positive electrode, while the set of conductive rows 225 may be formed of a negative electrode, or vice versa. Examples of positive electrode materials may include $LiCoO_2$, $LiNi_{0.8}Co_{0.15}Al_{0.05}O_2$, $LiNi_{1/3}Mn_{1/3}Co_{1/3}O_2$, and $LiFePO_4$, while examples of negative electrode materials may include graphite and $Li_4Ti_5O_{12}$.

Some examples of surface capacitance sensor grids may include projected capacitive touch (PCT), which may include self-capacitance and mutual capacitance. For mutual capacitance, the sensor grid 205 may have a capacitor 230 at each intersection of each row and column of the sets. A voltage may be applied to the columns 220 or the rows 225 of the set. By bringing a finger or conductive stylus near a surface of the sensor underneath the interface 210 may change a local electric field that may reduce a mutual capacitance across a capacitor 230 at an intersection of a column 220 and a row 225 of the set. The capacitance change at every individual point on the sensor grid 205 may be measured to accurately determine a touch location by measuring a voltage in the other axis. As such, mutual capacitance allows multi-touch operation where multiple fingers, palms or styli can be accurately tracked at the same time. Alternatively, for self-capacitance, the sensor grid 205 may also have a capacitor 230 at each intersection of each column 220 and row 225 of the sets, however, in this case the columns 220 and rows 225 may operate independently. That is, with self-capacitance, the sensor gird 205 may sense a current on the capacitive load of a finger on each column 220 or row 225 of the set. This produces a higher signal than in the mutual capacitance sensing, but it is unable to resolve accurately more than one finger, which results in misplaced location sensing.

The device 105-a may determine a presence of one or more protective cover films 215 in contact with a surface of the interface 210 based on mutual capacitance measurements or self-capacitance measurements. For example, the device 105-a may measure a mutual capacitance between a subset of conductive columns 220 or a subset of conductive rows 225 associated with the sensor grid 205. Upon measuring the mutual capacitance, the device 105-a may compare the measured mutual capacitance between the subset of conductive columns 220 or the subset of conductive rows 225 to a baseline mutual capacitance. The baseline mutual capacitance may be a manufacturing defined mutual capacitance associated with the set of conductive columns 220 and the set of conductive rows 225. For example, a manufacturing defined mutual capacitance may be a baseline mutual capacitance value (e.g. in Farads) of a mutual capacitance across a capacitor 230 at an intersection of each column 220 and each row 225 of the set. In some examples, the device 105-a may additionally, or alternatively measure a touch capacitance associated with a touch-point in contact with the surface of the interface 210. In this example, the device 105-a may add the touch capacitance to the measured mutual capacitance, and compare the measured mutual capacitance including the touch capacitance to the baseline mutual capacitance.

According to the comparisons, the device 105-a may determine a presence of the one or more protective cover films 215 in contact with the surface of the interface 210. The one or more protective cover films 215 may include a polyimide, a polyethylene, a terephthalate, a polyethylene terephthalate polyester, a polyurethane, or a pressure sensitive adhesive, or a combination thereof. In some examples, the device 105-a may determine a presence of multiple protective cover films 215 based on the measured mutual capacitance. For example, the device 105-a may determine a presence of a first protective cover film 215, or additionally presence of a second protective cover film 215 in contact with and above the first protective cover film 215. Each additional layer of protective cover film 215 may affect (e.g., increase) the measured mutual capacitance, while each exclusion of the protective cover film 215 may decrease the measured mutual capacitance. In some examples, the first protective cover film 215 may be in contact with a first region of the surface of the interface 210 and the second protective cover film 215 may be in contact with a second region of the surface of the interface 210 different from the first region. That is, both the first protective cover film 215 and the second protective cover film 215 may be on a same level (e.g. layer, plane) of the surface of the interface 210, but occupy different regions of the surface of the interface 210.

To mitigate the impact of the protective cover film(s) 215 on the functionality of the sensor grid 210, the device 105-a may adjust an operating characteristic, such as sensitivity or linearity, of the sensor grid 210. For example, the device 105-a may identify a set of calibration values corresponding to the protective cover film(s) 215, and adjust a sensitivity or linearity of the sensor grid 210 using the set of calibration values. In some examples, the device 105-a may map the measured mutual capacitance to a first lookup entry in a set of lookup entries, and identify a class of the protective cover film(s) 215. The set of lookup entries may include a set of classes of protective layers and a mutual capacitance corresponding to each class of protective layers.

The device 105-a may also map the class of the protective layer to a second lookup entry in the set of lookup entries. In this example, the set of lookup entries may include a set of calibration values to compensate for a difference between the measured mutual capacitance and the baseline mutual capacitance. As such, the device 105-a may adjust (e.g., calibrate) the operating characteristic of the sensor grid 205 based on the class of the protective layer and corresponding set of calibration values associated with the class. In some examples, the set of lookup entries may be part of a lookup table stored locally on the device 105-a. For example, a lookup table may be part of a relational database, a non-relational database, among other databases that stores a variety of information, such as instructions or commands (e.g., classes of protective layers, calibration information).

In an example where multiple protective cover film(s) 215 may be in contact with a first region of the surface of the interface 210 and the second protective cover film 215 may be in contact with a second region of the surface of the interface 210 different from the first region. That is, both the first protective cover film 215 and the second protective cover film 215 may be on a same level (e.g. layer, plane) of the surface of the interface 210, but occupy different regions of the surface of the interface 210, the device 105-a may adjust (e.g., calibrate) the operating characteristic of the sensor grid 205 based on the class of each corresponding protective cover film 215 and corresponding set of calibration values associated with the class for the individual cover film 215. For example, the first protective cover film 215 may be associated with a first class of and a first set of calibration values associated with the first class, while the second protective cover film 215 may be associated with a second class of and a second set of calibration values associated with the second class.

In some examples, the device 105-a may determine an effective mutual capacitance associated with the multiple protective cover film(s) 215 to perform the mapping. The device 105-a may also determine the presence of multiple protective cover film(s) 215 based on detection of a marker (e.g., an elemental marker), which can be used by the device 105-a to identity a material (e.g., a polyimide, a polyethylene, a terephthalate, a polyethylene terephthalate polyester, a polyurethane, or a pressure sensitive adhesive) of each protective cover film(s) 215. As a result, the device 105-a may determine presence of multiple protective cover film(s) 215 and whether the protective cover film(s) 215 are formed of a same or different material, for example, based on detection of a marker.

In some examples, the device 105-a may map the measured mutual capacitance to a second lookup entry in the set of lookup entries. This set of lookup entries may include a layer thickness corresponding to the mutual capacitance of each class of protective layers, which the device 105-a may use to estimate a layer thickness of the protective cover film(s) 215. The device 105-a may use the estimated layer thickness to map to a third lookup entry in the set of lookup entries, which may include a set of calibration values to compensate for a difference between the measured mutual capacitance and the baseline mutual capacitance. As such, the device 105-a may additionally, or alternatively calibrate the sensor grid 205 according to an estimated layer thickness of the protective cover film(s) 215 and related set of calibration values for the thickness. In some examples, the device 105-a may drive frequencies to better map effective thickness and material of the protective cover film(s) 215. For example, the device 105-a may evaluate the amount of absorption, reflection, and transmission of a signal (e.g., sound signal) at different frequencies to determine the effective thickness and material of the protective cover film(s) 215. An amount of absorption, reflection, and transmission may map to a certain effective thickness and material of the protective cover film(s) 215 in a set of lookup entries. The device 105-a may use the effective thickness and material to map to another lookup entry in the set of lookup entries, which may include a set of calibration values to compensate for a difference between the measured mutual capacitance and the baseline mutual capacitance.

In some examples, temperature changes may have a similar or even greater effect on the mutual capacitance than just presence of the protective cover film(s) 215, making temperature monitoring and calibration compensation desirable. To mitigate the impact of temperature changes on the functionality of the sensor grid 210, the device 105-a may account for the temperature changes to calibrate the senor gird 210. For example, the device 105-a may determine an ambient temperature associated with the measured mutual capacitance between the subset of conductive columns 220 and the subset of conductive rows 225, and compare the ambient temperature associated with the measured mutual capacitance to a baseline temperature associated with the baseline mutual capacitance. In some examples, the device 105-*a* may determine a mutual capacitance offset value based on the comparison, and map the mutual capacitance offset value to a second lookup entry in the set of lookup entries. In this example, the set of lookup entries may include a set of calibration values to compensate for the mutual capacitance offset value associated with a difference between the ambient temperature associated with the measured mutual capacitance and the baseline temperature associated with the baseline mutual capacitance. Therefore, the device 105-*a* may adjust an operating characteristic of the sensor grid 205, for example, such as a sensitivity or linearity of the sensor grid 205 according to the mutual capacitance offset value and the corresponding set of calibration values.

The techniques described herein may provide improvements in detection of one or more protective cover film(s) 215 on a surface of the interface 210 associated with the device 105-*a*. Furthermore, the techniques described herein may provide benefits and enhancements to the operation of the device 105-*a* (e.g., improved sensitivity or linearity of a sensor grid associated with and underneath the interface 210). For example, by supporting efficient and effective techniques for detection of one or more protective cover film(s) 215, the operational characteristics, such as power consumption, processor utilization, and memory usage of the device 105-*a* may be reduced. The techniques described herein may also provide efficiency to the device 105-*a* by reducing latency associated with processes related to the detection of one or more protective cover film(s) 210.

Figure 3:
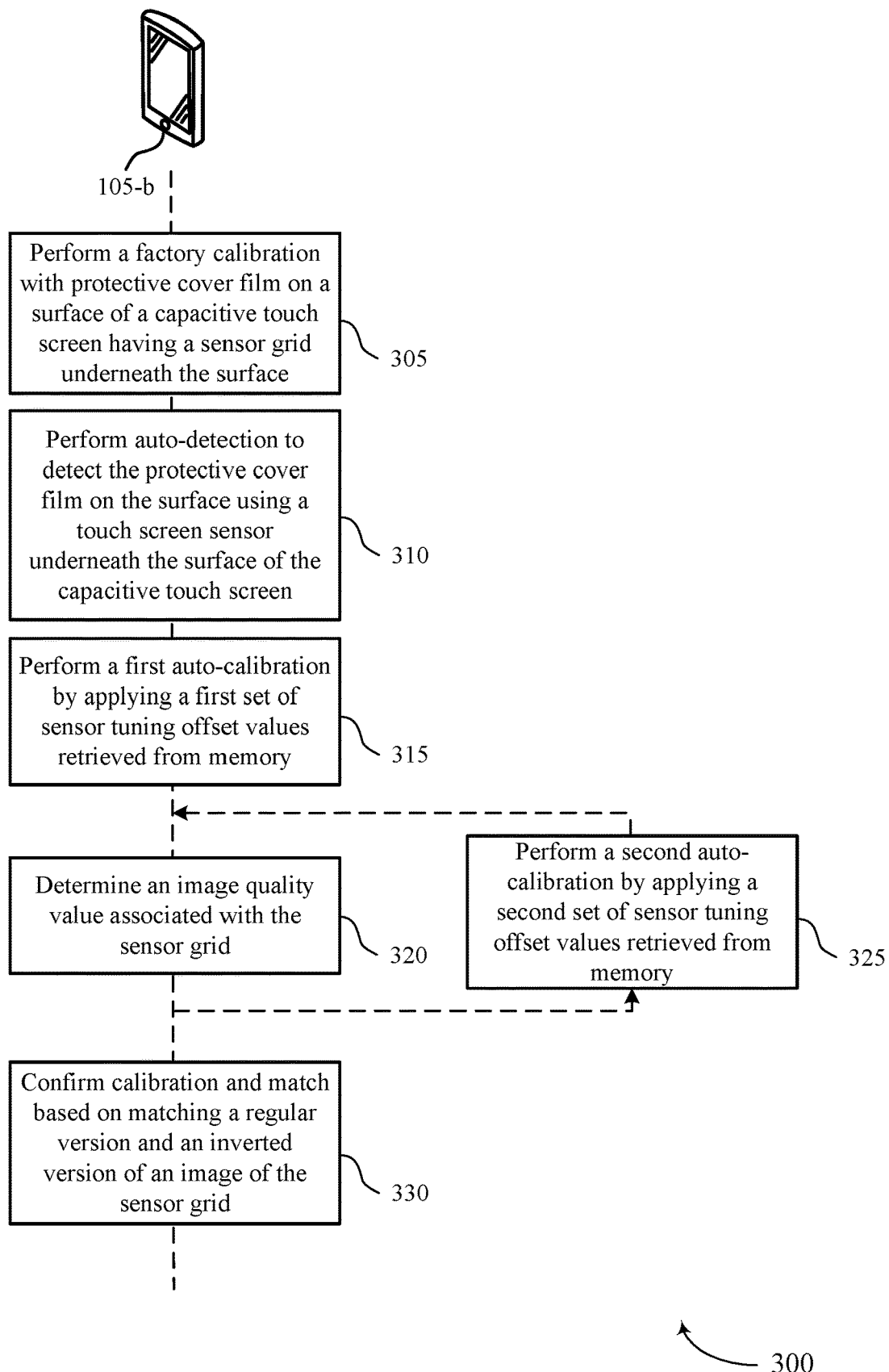
FIG. 3 illustrates an example of a method that supports detection of a protective cover film on a capacitive touch screen in accordance with aspects of the present disclosure.

FIG. 3 illustrates an example of a method 300 that supports detection of a protective cover film on a capacitive touch screen in accordance with aspects of the present disclosure. In some examples, the method 300 may support autodetection of a protective cover film on a capacitive touch screen and an autocalibration technique. The operations of method 300 may be implemented by a device or its components as described herein. For example, the operations of method 300 may be performed by a device 105-*b* or an operations manager 135 as described with reference to FIG. 1. In some examples, the device 105-*b* may execute a set of instructions to control the functional elements of the device 105-*b*, as described with reference to FIG. 1, to perform the functions described below. Additionally or alternatively, the device 105-*b* may perform aspects of the functions described below using special-purpose hardware. Certain operations may also be left out of the method 300, or other operations may be added to the method 300.

At 305, the device 105-*b* may perform a factory calibration with protective cover film on a surface of a capacitive touch screen having a sensor grid underneath the surface. At 310, the device 105-*b* may perform auto-detection to detect the protective cover film on the surface using a touch screen sensor underneath the surface of the capacitive touch screen.

At 315, the device 105-*b* may perform a first auto-calibration by applying a first set of sensor tuning offset values retrieved from memory, for example, as described in FIG. 2 with reference to a set of lookup entries.

At 320, the device 105-*b* may determine an image quality (IQ) value associated with the sensor grid. For example, the device 105-*b* may determine the IQ value using one or more image processing techniques. In image processing terms, with reference to FIG. 2, self-capacitance sensors rely on projections much like tomographic imaging, while mutual capacitance sensors are true pixel array designs capable of forming an image directly. Therefore, the device 105-*b* may determine presence of a protective cover film on the surface of capacitive touch screen based on an image associated with the sensor grid and the surface of the capacitive touch screen surface. For example, the device 105-*b* may compare a baseline image associated with a mutual capacitance of the sensor grid without a protective cover film on the surface of the capacitive touch screen, and a captured image with a protective cover film on the surface of the capacitive touch screen.

At 325, the device 105-*b* may perform a second auto-calibration by applying a second set of sensor tuning offset values retrieved from memory. For example, the device 105-*b* may perform the second auto-calibration based on the IQ value being below a threshold. Otherwise, if the IQ value is equal to or greater than the threshold, at 330, the device 105-*b* may confirm calibration and match based on matching a regular version and an inverted version of an image of the sensor grid.

Accordingly, the method 300 may provide improvements in detection of one or more protective cover film(s) on a surface of capacitive touch screen associated with the device 105-*b*. The method 300 may also provide benefits and enhancements to the operation of the device 105-*b* (e.g., improved sensitivity or linearity of a sensor grid associated with and underneath the capacitive touch screen). For example, by supporting efficient and effective techniques for detection of one or more protective cover film(s), the operational characteristics, such as power consumption and processor utilization, of a sensor grid associated with the device 105-*b* may be reduced.

Although the method 300 is described in context of using image processing techniques, other techniques may additionally, or alternatively be supported by the device 105-*b* to support autodetection of a protective cover film on a capacitive touch screen and an autocalibration technique. For example, the device 105-*b* may support QFS-D background image techniques such as, film signature in air image (e.g., frame, horizontal, vertical lines, other patterns), BGE basis comparison, BG signal phase, and differential BG images (e.g., RGD1-RGD2, among others. In another example, the device 105-*b* may support QFS-D finger image techniques such as, US finger-detection method for screen signatures, scanning different tuned conditions and detection of a best IQ value, autofocus techniques (e.g., factory calibration with and without offset), determining for FP IQ signature (e.g., IQ metrics, phase), and thermal response, among others. In further examples, the device 105-*b* may support autodetection of a protective cover film on a capacitive touch screen and an autocalibration technique based on external input (e.g., user input, markers on protective cover films (e.g., magnetic, RFID, etc.), among others.

Figure 4:
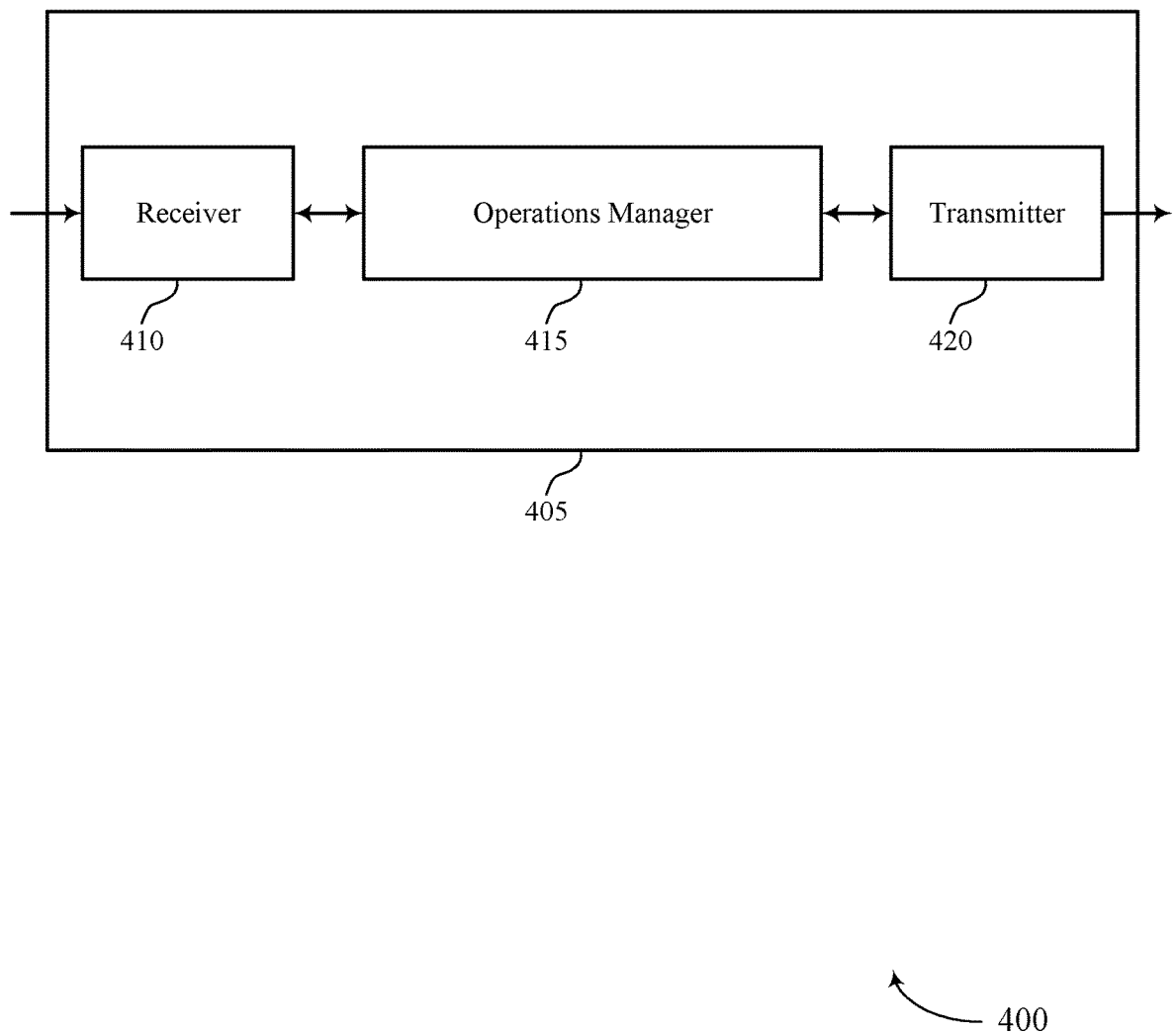
FIGS. 4 and 5 show block diagrams of devices that support detection of a protective cover film on a capacitive touch screen in accordance with aspects of the present disclosure.

FIG. 4 shows a block diagram 400 of a device 405 that supports detection of a protective cover film on a capacitive touch screen in accordance with aspects of the present disclosure. The device 405 may be an example of aspects of a device as described herein. The device 405 may include a receiver 410, an operations manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to detection of a protective cover film on a capacitive touch screen, etc.). Information may be passed on to other components of the device 405. The receiver 410 may be an example of aspects of the transceiver 720 described with reference to FIG. 7. The receiver 410 may utilize a single antenna or a set of antennas.

The operations manager 415 may measure a mutual capacitance between a subset of conductive columns or a subset of conductive rows associated with a sensor grid, compare the measured mutual capacitance between the subset of conductive columns or the subset of conductive rows to a baseline mutual capacitance associated with the set of conductive columns and the set of conductive rows, determine a presence of a protective layer in contact with the surface of the capacitive touch screen based on the comparison, and adjust an operating characteristic of the sensor grid based on the presence of the protective layer in contact with the surface of the capacitive touch screen. The operations manager 415 may be an example of aspects of the operations manager 710 described herein.

The operations manager 415, or its sub-components, may be implemented in hardware, code (e.g., software or firmware) executed by a processor, or any combination thereof. If implemented in code executed by a processor, the functions of the operations manager 415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The operations manager 415, or its sub-components, may be physically located at various positions, including being distributed such that portions of functions are implemented at different physical locations by one or more physical components. In some examples, the operations manager 415, or its sub-components, may be a separate and distinct component in accordance with various aspects of the present disclosure. In some examples, the operations manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
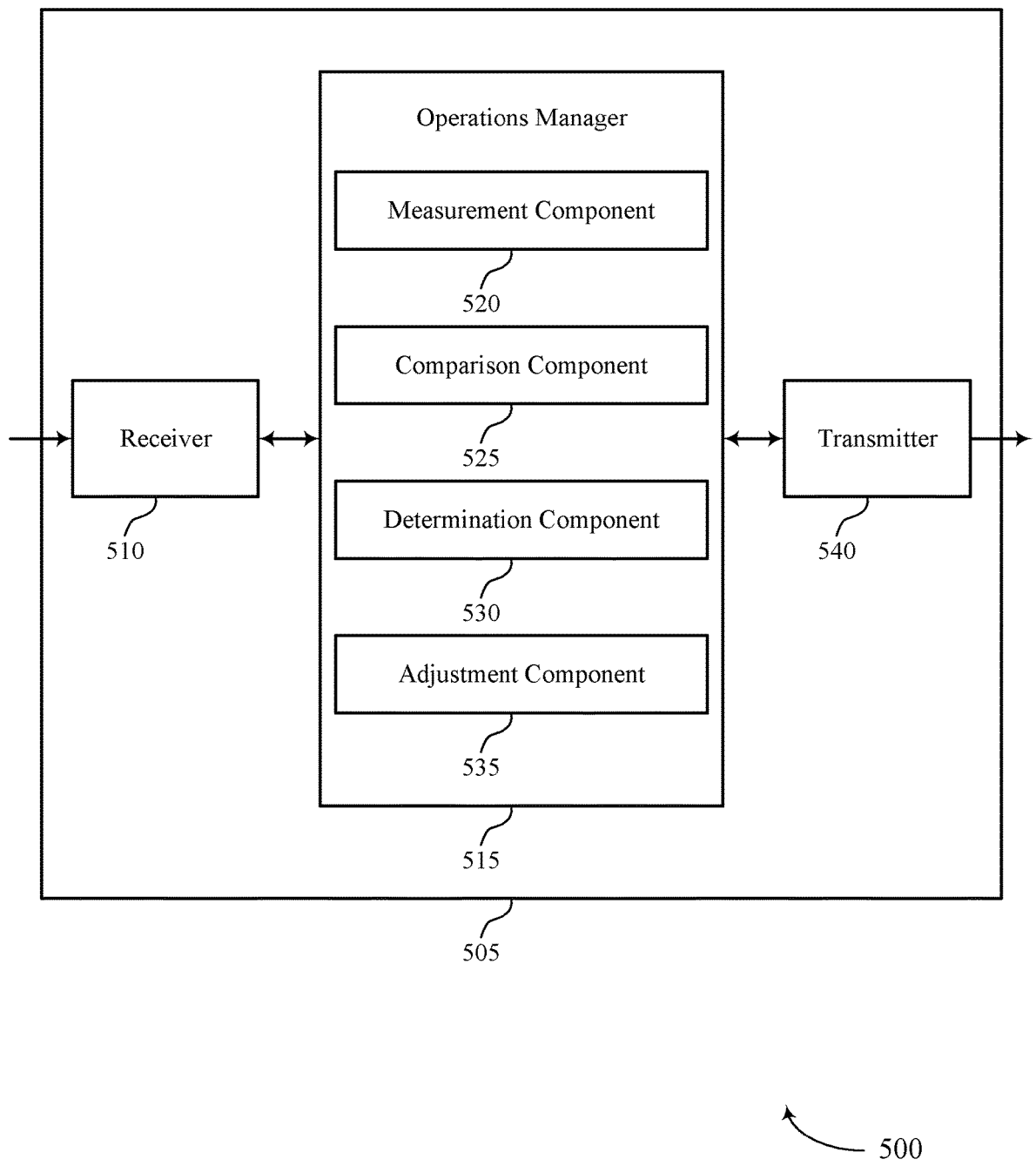

FIG. 5 shows a block diagram 500 of a device 505 that supports detection of a protective cover film on a capacitive touch screen in accordance with aspects of the present disclosure. The device 505 may be an example of aspects of a device 405 or a device 115 as described herein. The device 505 may include a receiver 510, an operations manager 515, and a transmitter 540. The device 505 may also include a processor. Each of these components may be in communication with one another (e.g., via one or more buses).

The receiver 510 may receive information such as packets, user data, or control information associated with various information channels (e.g., control channels, data channels, and information related to detection of a protective cover film on a capacitive touch screen, etc.). Information may be passed on to other components of the device 505. The receiver 510 may be an example of aspects of the transceiver 720 described with reference to FIG. 7. The receiver 510 may utilize a single antenna or a set of antennas.

The operations manager 515 may be an example of aspects of the operations manager 415 as described herein. The operations manager 515 may include a measurement component 520, a comparison component 525, a determination component 530, and an adjustment component 535. The operations manager 515 may be an example of aspects of the operations manager 710 described herein.

The measurement component 520 may measure a mutual capacitance between a subset of conductive columns or a subset of conductive rows associated with a sensor grid. The comparison component 525 may compare the measured mutual capacitance between the subset of conductive columns or the subset of conductive rows to a baseline mutual capacitance associated with the set of conductive columns and the set of conductive rows. The determination component 530 may determine a presence of a protective layer in contact with the surface of the capacitive touch screen based on the comparison. The adjustment component 535 may adjust an operating characteristic of the sensor grid based on the presence of the protective layer in contact with the surface of the capacitive touch screen.

The transmitter 540 may transmit signals generated by other components of the device 505. In some examples, the transmitter 540 may be collocated with a receiver 510 in a transceiver module. For example, the transmitter 540 may be an example of aspects of the transceiver 720 described with reference to FIG. 7. The transmitter 540 may utilize a single antenna or a set of antennas.

Figure 6:
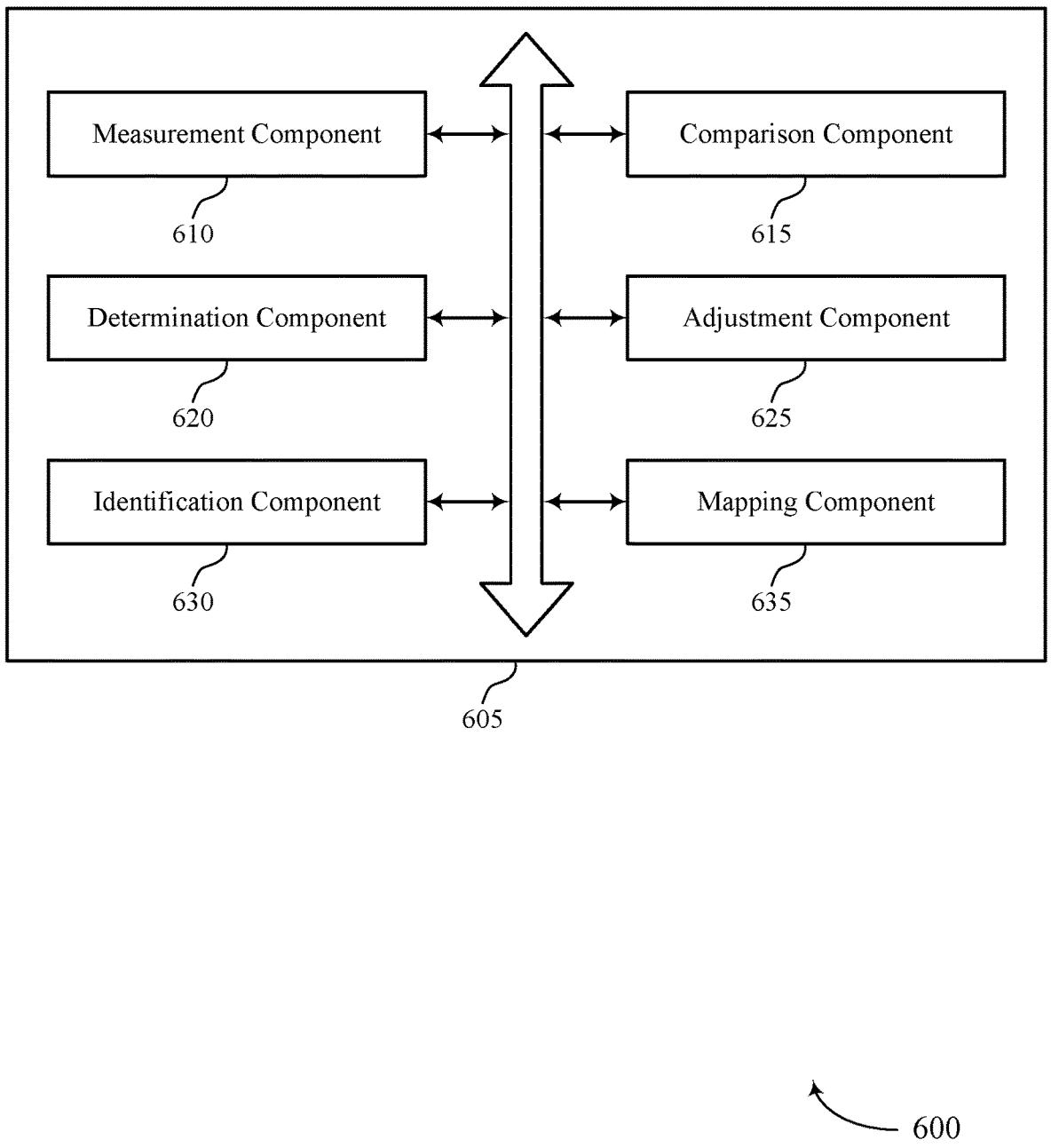
FIG. 6 shows a block diagram of an operations manager that supports detection of a protective cover film on a capacitive touch screen in accordance with aspects of the present disclosure.

FIG. 6 shows a block diagram 600 of an operations manager 605 that supports detection of a protective cover film on a capacitive touch screen in accordance with aspects of the present disclosure. The operations manager 605 may be an example of aspects of an operations manager 415, an operations manager 515, or an operations manager 710 described herein. The operations manager 605 may include a measurement component 610, a comparison component 615, a determination component 620, an adjustment component 625, an identification component 630, and a mapping component 635. Each of these modules may communicate, directly or indirectly, with one another (e.g., via one or more buses).

The measurement component 610 may measure a mutual capacitance between a subset of conductive columns or a subset of conductive rows associated with a sensor grid underneath a surface of a capacitive touch screen. In some examples, the measurement component 610 may determine an ambient temperature associated with the measured mutual capacitance between the subset of conductive columns or the subset of conductive rows. In some examples, the measurement component 610 may measure a touch capacitance associated with a touch-point in contact with the surface of the capacitive touch screen. In some examples, the measurement component 610 may add the touch capacitance to the measured mutual capacitance.

The comparison component 615 may compare the measured mutual capacitance between the subset of conductive columns or the subset of conductive rows to a baseline mutual capacitance associated with the set of conductive columns and the set of conductive rows. In some examples, the comparison component 615 may compare the ambient temperature associated with the measured mutual capacitance to a baseline temperature associated with the baseline mutual capacitance, where adjusting an operating characteristic of the sensor grid may be based on the comparison between the ambient temperature associated with the measured mutual capacitance and the baseline temperature associated with the baseline mutual capacitance. In some examples, the comparison component 615 may compare the measured mutual capacitance including the touch capacitance to the baseline mutual capacitance, where determining a presence of a protective layer in contact with the surface of the capacitive touch screen may be based on the comparison of the measured mutual capacitance including the touch capacitance to the baseline mutual capacitance. In some cases, the baseline mutual capacitance may be a manufacturing defined mutual capacitance associated with the set of conductive columns and the set of conductive rows.

The determination component 620 may determine a presence of a protective layer in contact with the surface of the capacitive touch screen based on the comparison. In some examples, the determination component 620 may determine a mutual capacitance offset value based on the comparison. In some examples, the determination component 620 may determine a presence of a second protective layer in contact with the surface of the capacitive touch screen based on the comparison, where adjusting an operating characteristic of the sensor grid is further based on the presence of the protective layer and the second protective layer in contact with the surface of the capacitive touch screen. In some cases, the protective layer may be in contact with a first region of the surface of the capacitive touch screen and the second protective layer may be in contact with a second region of the surface of the capacitive touch screen different from the first region. In some cases, the protective layer includes at least one of a polyimide, a polyethylene, a terephthalate, a polyethylene terephthalate polyester, a polyurethane, or a pressure sensitive adhesive, or a combination thereof.

The adjustment component 625 may adjust an operating characteristic of the sensor grid based on the presence of the protective layer in contact with the surface of the capacitive touch screen. In some examples, the adjustment component 625 may adjust a sensitivity or linearity of the sensor grid based on the set of calibration values. In some examples, the adjustment component 625 may calibrate the sensor grid based on the set of calibration values, where adjusting the operating characteristic of the sensor grid is further based on the calibration.

The identification component 630 may identify a set of calibration values corresponding to the protective layer. In some examples, the identification component 630 may identify a class of the protective layer based on the mapping, where adjusting the operating characteristic of the sensor grid is further based on the class of the protective layer. In some examples, the identification component 630 may estimate a layer thickness of the protective layer based on the mapping, where identifying the class of the protective layer is further based on the estimated thickness of the protective layer.

The mapping component 635 may map the measured mutual capacitance to a first lookup entry in a set of lookup entries, where the set of lookup entries includes a set of classes of protective layers and a mutual capacitance corresponding to each class of protective layers. In some examples, mapping the class of the protective layer to a second lookup entry in the set of lookup entries, where the set of lookup entries includes a set of calibration values to compensate for a difference between the measured mutual capacitance and the baseline mutual capacitance. In some examples, mapping the measured mutual capacitance to a second lookup entry in the set of lookup entries, where the set of lookup entries includes a layer thickness corresponding to the mutual capacitance of each class of protective layers. In some examples, mapping the estimated layer thickness of the protective layer to a third lookup entry in the set of lookup entries, where the set of lookup entries further includes a set of calibration values to compensate for a difference between the measured mutual capacitance and the baseline mutual capacitance. In some examples, mapping the mutual capacitance offset value to a second lookup entry in the set of lookup entries, where the set of lookup entries includes a set of calibration values to compensate for the mutual capacitance offset value associated with a difference between the ambient temperature associated with the measured mutual capacitance and the baseline temperature associated with the baseline mutual capacitance, where adjusting the operating characteristic of the sensor grid is further based on the mutual capacitance offset value.

Figure 7:
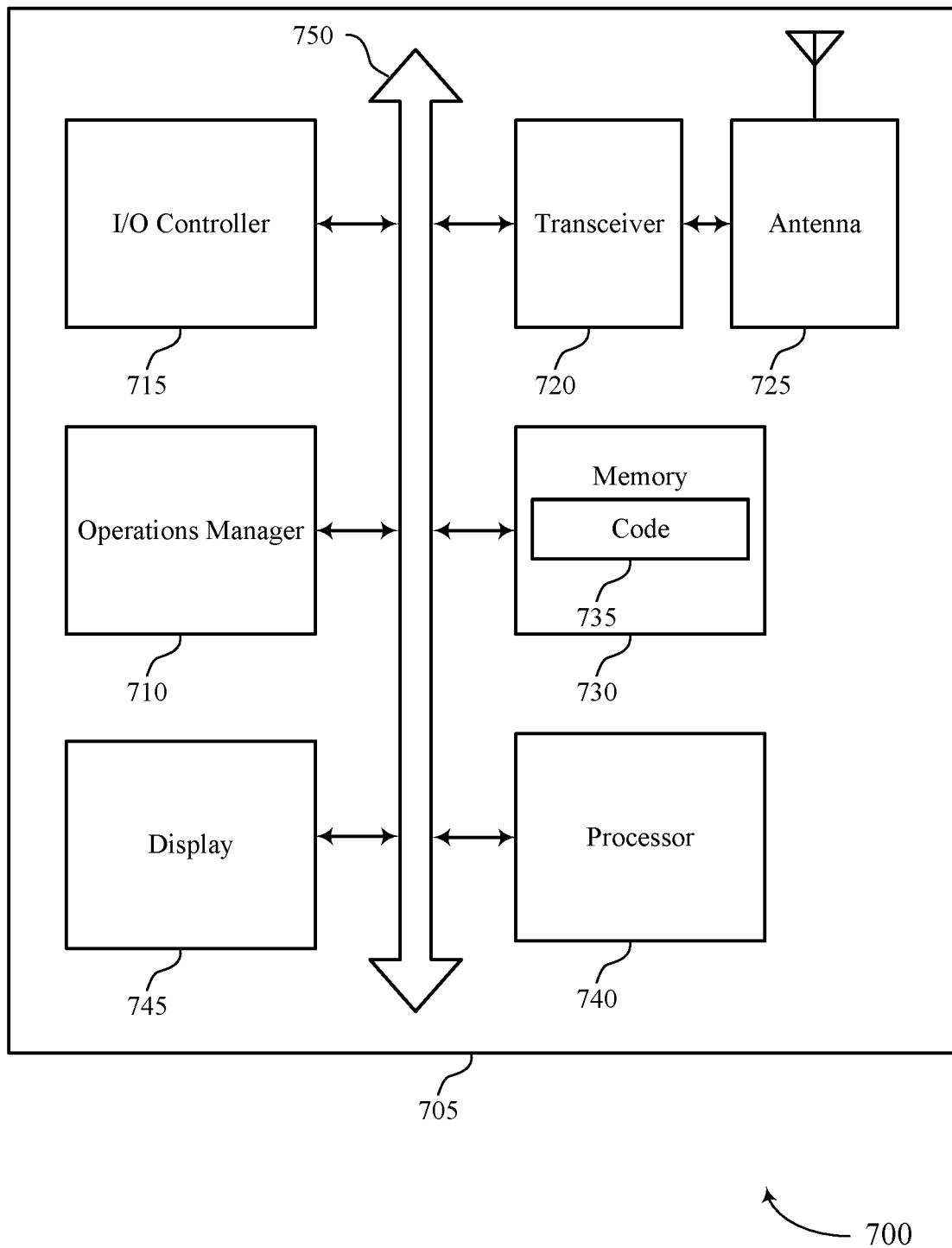
FIG. 7 shows a diagram of a system including a device that supports detection of a protective cover film on a capacitive touch screen in accordance with aspects of the present disclosure.

FIG. 7 shows a diagram of a system 700 including a device 705 that supports detection of a protective cover film on a capacitive touch screen in accordance with aspects of the present disclosure. The device 705 may be an example of or include the components of device 405, device 505, or a device as described herein. The device 705 may include components for bi-directional voice and data communications including components for transmitting and receiving communications, including an operations manager 710, an I/O controller 715, a transceiver 720, an antenna 725, memory 730, a processor 740, and a display 745. These components may be in electronic communication via one or more buses (e.g., bus 750).

The operations manager 710 may measure a mutual capacitance between a subset of conductive columns or a subset of conductive rows associated with a sensor grid, compare the measured mutual capacitance between the subset of conductive columns or the subset of conductive rows to a baseline mutual capacitance associated with the set of conductive columns and the set of conductive rows, determine a presence of a protective layer in contact with a surface of the capacitive touch screen based on the comparison, and adjust an operating characteristic of the sensor grid based on the presence of the protective layer in contact with the surface of the capacitive touch screen.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some cases, the device 705 may include a single antenna 725. However, in some cases the device 705 may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some cases, the memory 730 may contain, among other things, a BIOS which may control basic hardware or software operation such as the interaction with peripheral components or devices.

The code 735 may include instructions to implement aspects of the present disclosure, including instructions to support detection of a protective cover film on a capacitive touch screen. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting detection of a protective cover film on a capacitive touch screen).

The display 745 may be a resistance touch-based interface, a capacitance touch-based interface, a surface acoustic wave-based interface, an optical touch-based interface, an electromagnetic guidance-based interface, among others. In some examples, the display 745 may have a surface and a sensor grid underneath the surface having a set of conductive columns and a set of conductive rows. In some examples, the display 745 may include a liquid-crystal display (LCD), a LED display, an organic LED (OLED), an active-matrix OLED (AMOLED), or the like. In some examples, the display 745 and I/O component 645 may be or represent aspects of a same component (e.g., a touch-screen) of the device 705.

Figure 8:
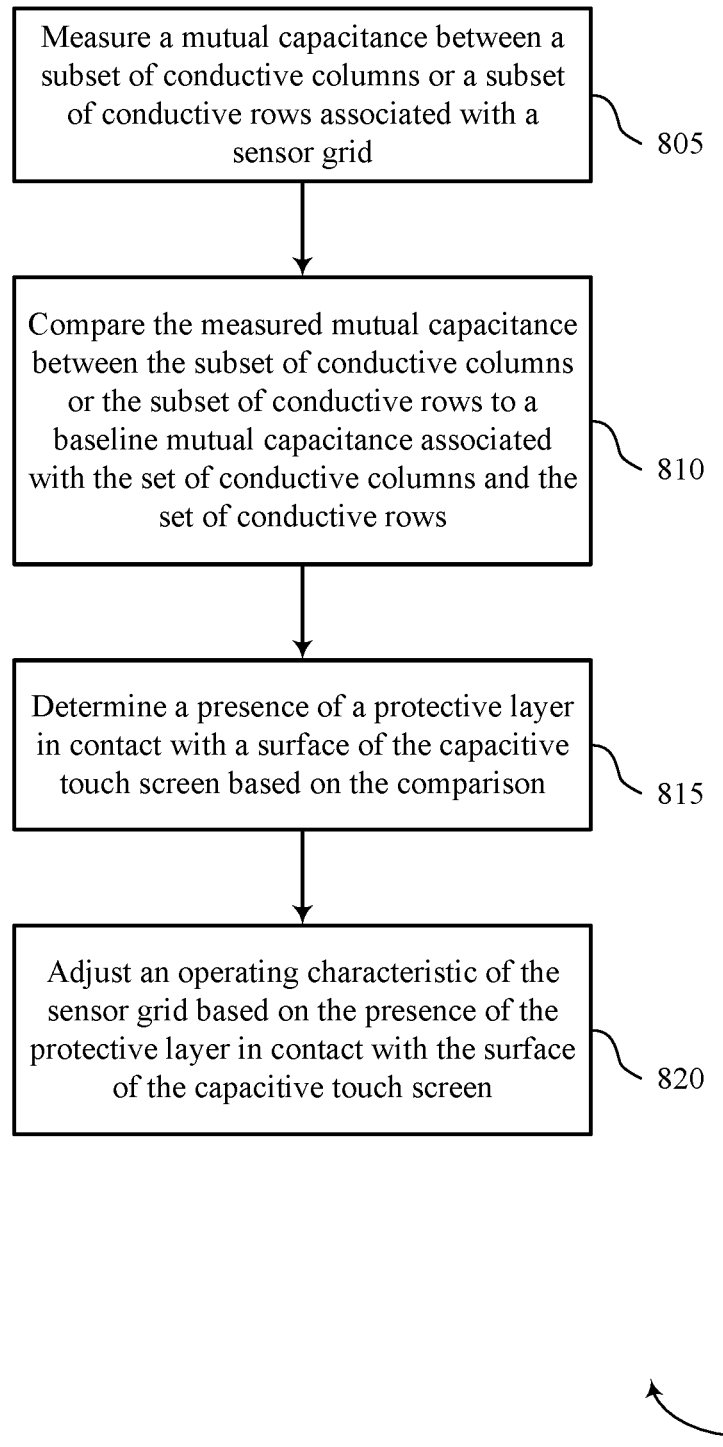
FIGS. 8 through 11 show flowcharts illustrating methods that support detection of a protective cover film on a capacitive touch screen in accordance with aspects of the present disclosure.

FIG. 8 shows a flowchart illustrating a method 800 that supports detection of a protective cover film on a capacitive touch screen in accordance with aspects of the present disclosure. The operations of method 800 may be implemented by a device or its components as described herein. For example, the operations of method 800 may be performed by an operations manager as described with reference to FIGS. 4 through 7. In some examples, a device may execute a set of instructions to control the functional elements of the device to perform the functions described below. Additionally or alternatively, a device may perform aspects of the functions described below using special-purpose hardware.

At 805, the device may measure a mutual capacitance between a subset of conductive columns or a subset of conductive rows associated with a sensor grid. The operations of 805 may be performed according to the methods described herein. In some examples, aspects of the operations of 805 may be performed by a measurement component as described with reference to FIGS. 4 through 7.

At 810, the device may compare the measured mutual capacitance between the subset of conductive columns or the subset of conductive rows to a baseline mutual capacitance associated with the set of conductive columns and the set of conductive rows. The operations of 810 may be performed according to the methods described herein. In some examples, aspects of the operations of 810 may be performed by a comparison component as described with reference to FIGS. 4 through 7.

At 815, the device may determine a presence of a protective layer in contact with a surface of the capacitive touch screen based on the comparison. The operations of 815 may be performed according to the methods described herein. In some examples, aspects of the operations of 815 may be performed by a determination component as described with reference to FIGS. 4 through 7.

At 820, the device may adjust an operating characteristic of the sensor grid based on the presence of the protective layer in contact with the surface of the capacitive touch screen. The operations of 820 may be performed according to the methods described herein. In some examples, aspects of the operations of 820 may be performed by an adjustment component as described with reference to FIGS. 4 through 7.

Figure 9:
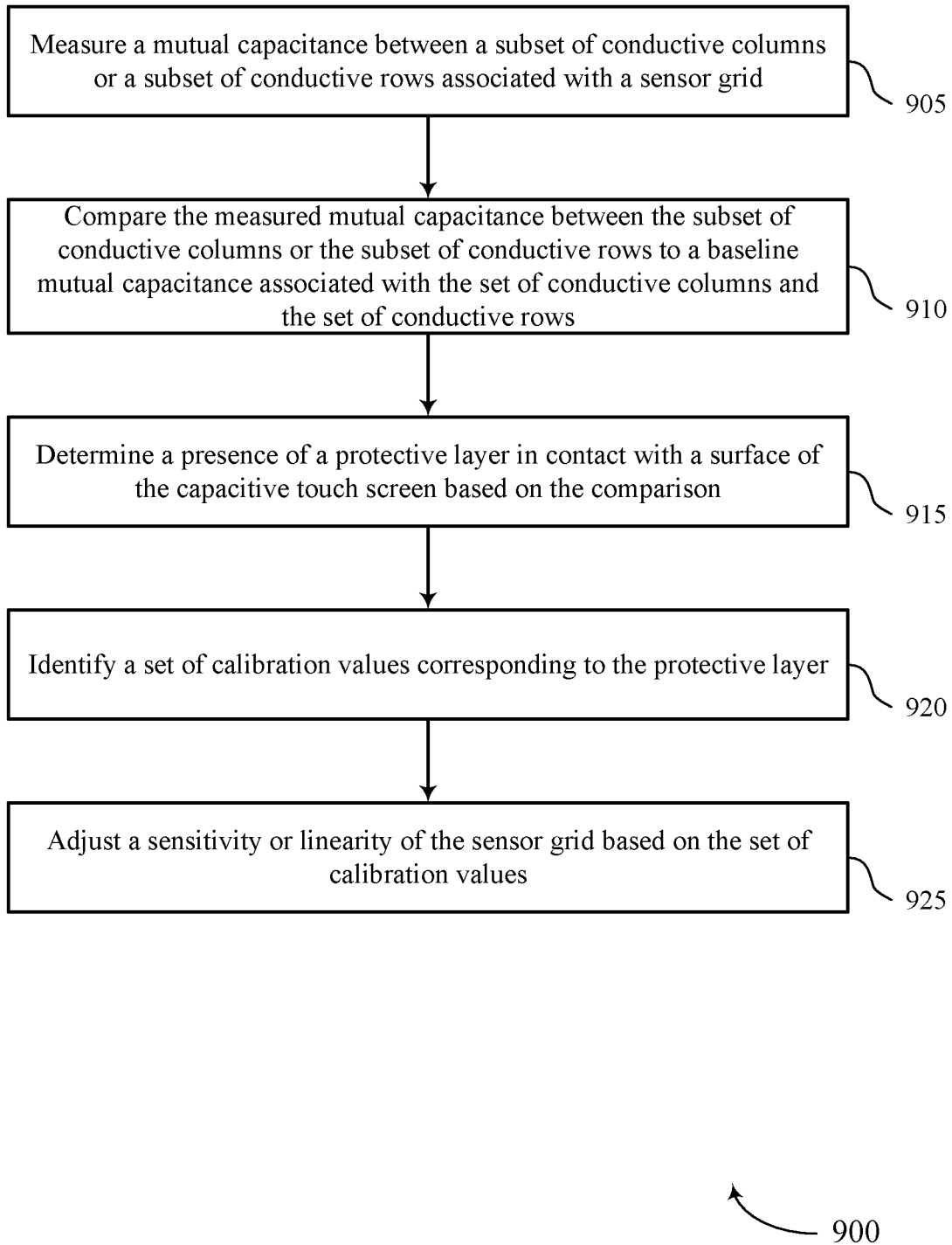

FIG. 9 shows a flowchart illustrating a method 900 that supports detection of a protective cover film on a capacitive touch screen in accordance with aspects of the present disclosure. The operations of method 900 may be implemented by a device or its components as described herein. For example, the operations of method 900 may be performed by an operations manager as described with reference to FIGS. 4 through 7. In some examples, a device may execute a set of instructions to control the functional elements of the device to perform the functions described below. Additionally or alternatively, a device may perform aspects of the functions described below using special-purpose hardware.

At 905, the device may measure a mutual capacitance between a subset of conductive columns or a subset of conductive rows associated with a sensor grid. The operations of 905 may be performed according to the methods described herein. In some examples, aspects of the operations of 905 may be performed by a measurement component as described with reference to FIGS. 4 through 7.

At 910, the device may compare the measured mutual capacitance between the subset of conductive columns or the subset of conductive rows to a baseline mutual capacitance associated with the set of conductive columns and the set of conductive rows. The operations of 910 may be performed according to the methods described herein. In some examples, aspects of the operations of 910 may be performed by a comparison component as described with reference to FIGS. 4 through 7.

At 915, the device may determine a presence of a protective layer in contact with a surface of the capacitive touch screen based on the comparison. The operations of 915 may be performed according to the methods described herein. In some examples, aspects of the operations of 915 may be performed by a determination component as described with reference to FIGS. 4 through 7.

At 920, the device may identify a set of calibration values corresponding to the protective layer. The operations of 920 may be performed according to the methods described herein. In some examples, aspects of the operations of 920 may be performed by an identification component as described with reference to FIGS. 4 through 7.

At 925, the device may adjust a sensitivity or linearity of the sensor grid based on the set of calibration values. The operations of 925 may be performed according to the methods described herein. In some examples, aspects of the operations of 925 may be performed by an adjustment component as described with reference to FIGS. 4 through 7.

Figure 10:
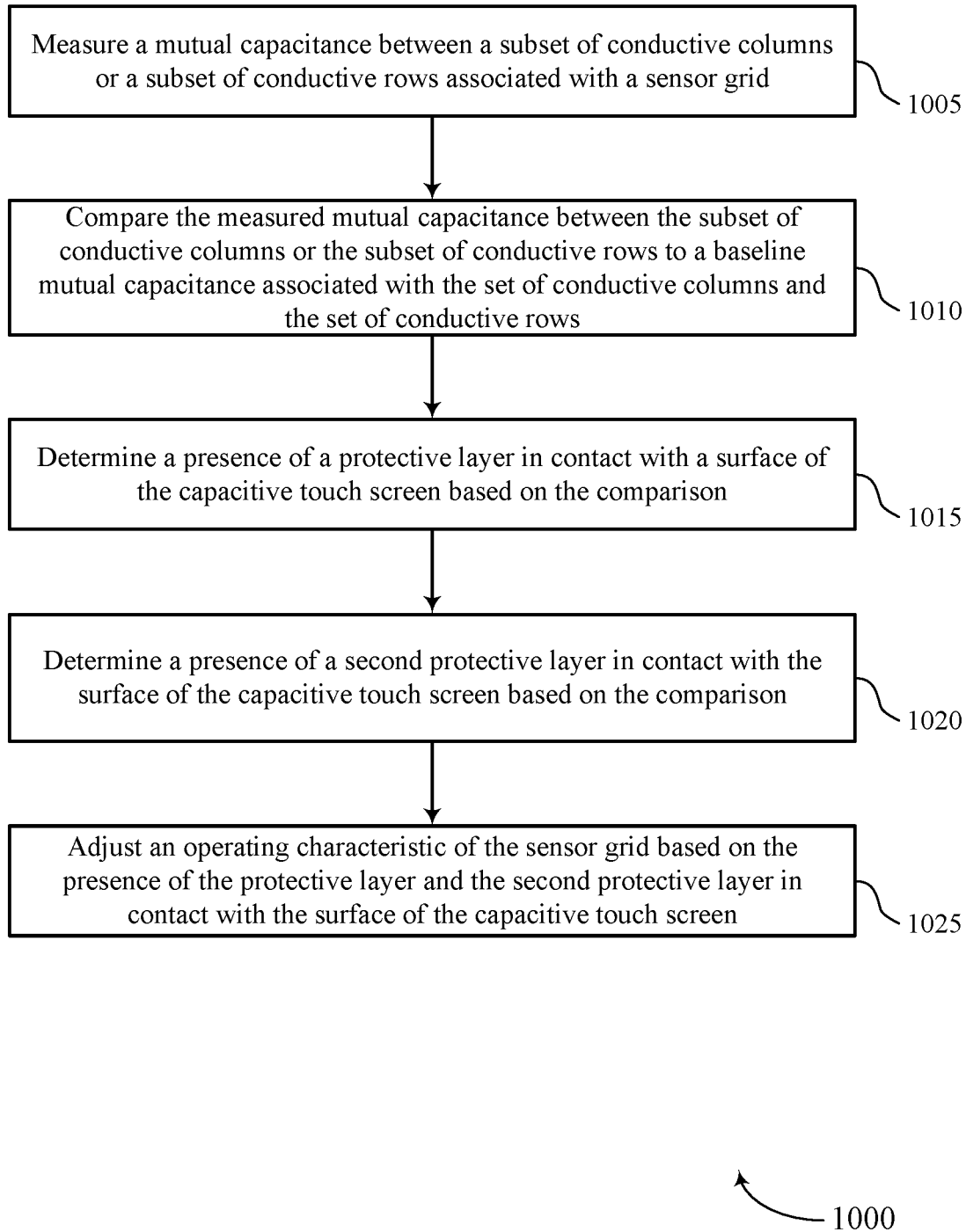

FIG. 10 shows a flowchart illustrating a method 1000 that supports detection of a protective cover film on a capacitive touch screen in accordance with aspects of the present disclosure. The operations of method 1000 may be implemented by a device or its components as described herein. For example, the operations of method 1000 may be performed by an operations manager as described with reference to FIGS. 4 through 7. In some examples, a device may execute a set of instructions to control the functional elements of the device to perform the functions described below. Additionally or alternatively, a device may perform aspects of the functions described below using special-purpose hardware.

At 1005, the device may measure a mutual capacitance between a subset of conductive columns or a subset of conductive rows associated with a sensor grid. The operations of 1005 may be performed according to the methods described herein. In some examples, aspects of the operations of 1005 may be performed by a measurement component as described with reference to FIGS. 4 through 7.

At 1010, the device may compare the measured mutual capacitance between the subset of conductive columns or the subset of conductive rows to a baseline mutual capacitance associated with the set of conductive columns and the set of conductive rows. The operations of 1010 may be performed according to the methods described herein. In some examples, aspects of the operations of 1010 may be performed by a comparison component as described with reference to FIGS. 4 through 7.

At 1015, the device may determine a presence of a protective layer in contact with a surface of the capacitive touch screen based on the comparison. The operations of 1015 may be performed according to the methods described herein. In some examples, aspects of the operations of 1015 may be performed by a determination component as described with reference to FIGS. 4 through 7.

At 1020, the device may determine a presence of a second protective layer in contact with the surface of the capacitive touch screen based on the comparison. The operations of 1020 may be performed according to the methods described herein. In some examples, aspects of the operations of 1020 may be performed by a determination component as described with reference to FIGS. 4 through 7.

At 1025, the device may adjust an operating characteristic of the sensor grid based on the presence of the protective layer and the second protective layer in contact with the surface of the capacitive touch screen. The operations of 1025 may be performed according to the methods described herein. In some examples, aspects of the operations of 1025 may be performed by an adjustment component as described with reference to FIGS. 4 through 7.

Figure 11:
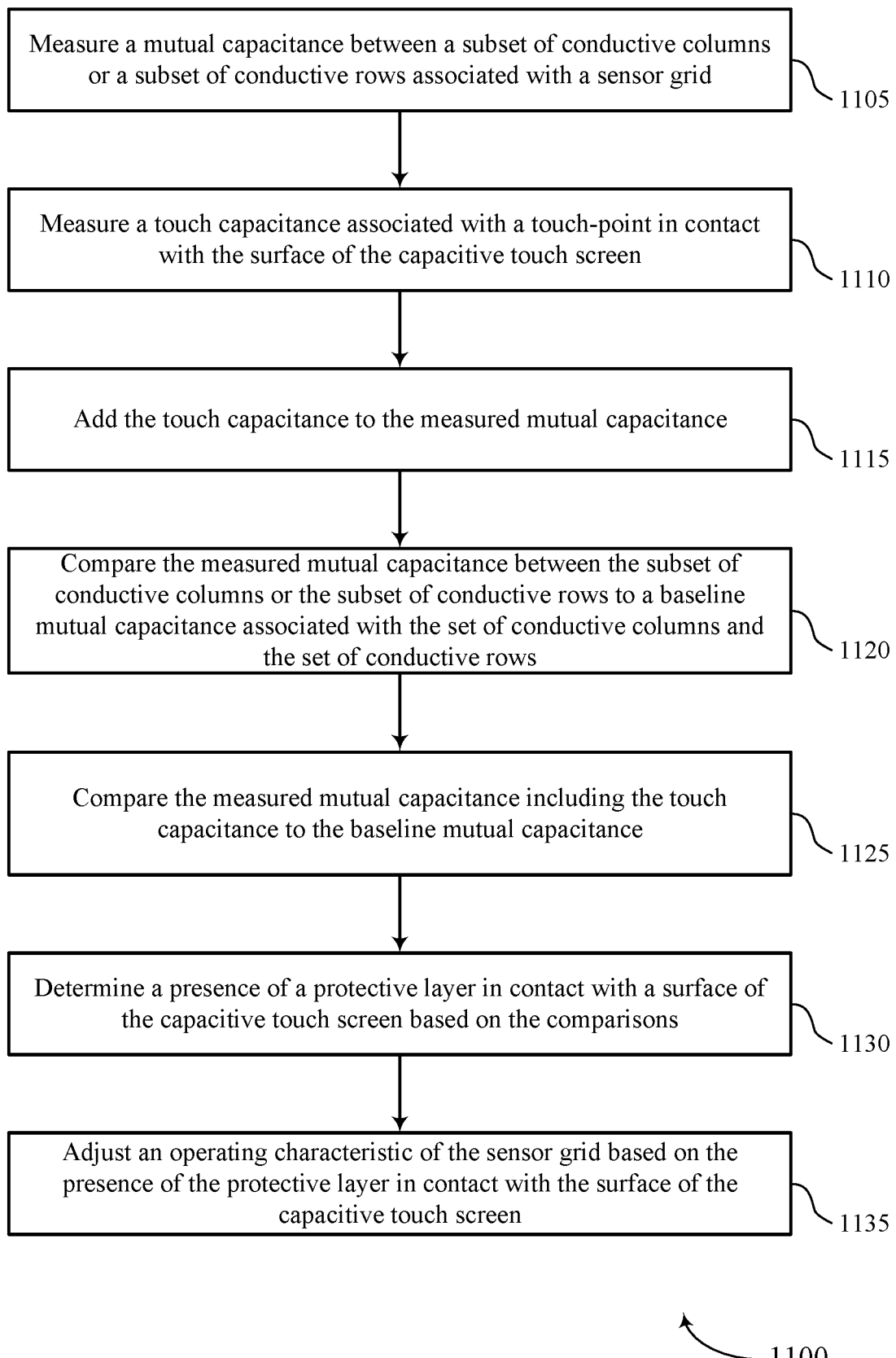

FIG. 11 shows a flowchart illustrating a method 1100 that supports detection of a protective cover film on a capacitive touch screen in accordance with aspects of the present disclosure. The operations of method 1100 may be implemented by a device or its components as described herein. For example, the operations of method 1100 may be performed by an operations manager as described with reference to FIGS. 4 through 7. In some examples, a device may execute a set of instructions to control the functional elements of the device to perform the functions described below. Additionally or alternatively, a device may perform aspects of the functions described below using special-purpose hardware.

At 1105, the device may measure a mutual capacitance between a subset of conductive columns or a subset of conductive rows associated with a sensor grid. The operations of 1105 may be performed according to the methods described herein. In some examples, aspects of the operations of 1105 may be performed by a measurement component as described with reference to FIGS. 4 through 7.

At 1110, the device may measure a touch capacitance associated with a touch-point in contact with the surface of the capacitive touch screen. The operations of 1110 may be performed according to the methods described herein. In some examples, aspects of the operations of 1110 may be performed by a measurement component as described with reference to FIGS. 4 through 7.

At 1115, the device may add the touch capacitance to the measured mutual capacitance. The operations of 1115 may be performed according to the methods described herein. In some examples, aspects of the operations of 1115 may be performed by a measurement component as described with reference to FIGS. 4 through 7.

At 1120, the device may compare the measured mutual capacitance between the subset of conductive columns or the subset of conductive rows to a baseline mutual capacitance associated with the set of conductive columns and the set of conductive rows. The operations of 1120 may be performed according to the methods described herein. In some examples, aspects of the operations of 1120 may be performed by a comparison component as described with reference to FIGS. 4 through 7.

At 1125, the device may compare the measured mutual capacitance including the touch capacitance to the baseline mutual capacitance. The operations of 1125 may be performed according to the methods described herein. In some examples, aspects of the operations of 1125 may be performed by a comparison component as described with reference to FIGS. 4 through 7.

At 1130, the device may determine a presence of a protective layer in contact with a surface of the capacitive touch screen based on the comparisons. The operations of 1130 may be performed according to the methods described herein. In some examples, aspects of the operations of 1130 may be performed by a determination component as described with reference to FIGS. 4 through 7.

At 1135, the device may adjust an operating characteristic of the sensor grid based on the presence of the protective layer in contact with the surface of the capacitive touch screen. The operations of 1135 may be performed according to the methods described herein. In some examples, aspects of the operations of 1135 may be performed by an adjustment component as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The phrase "coupled between" may refer to an order of components in relation to each other, and may refer to an electrical coupling. In one example, a component "B" that is electrically coupled between a component "A" and a component "C" may refer to an order of components of "A-B-C" or "C-B-A" in an electrical sense. In other words, electrical signals (e.g., voltage, charge, current) may be passed from component A to component C by way of component B. A description of a component B being "coupled between" component A and component C should not necessarily be interpreted as precluding other intervening components in the described order. For example, a component "D" may be coupled between the described component A and component B (e.g., referring to an order of components of "A-D-B-C" or "C-B-D-A" as examples), while still supporting component B being electrically coupled between component A and component C. In other words, the use of the phrase "coupled between" should not be construed as necessarily referencing an exclusive sequential order. Further, a description of component B being "coupled between" component A and component C does not preclude a second, different coupling between component A and component C. For example, component A and component C may be coupled with each other in a separate coupling that is electrically parallel with a coupling via component B. In another example, component A and component C may be coupled via another component "E" (e.g., component B being coupled between component A and component C and component E being coupled between component A and component C). In other words, the use of the phrase "coupled between" should not be construed as an exclusive coupling between components.

The term "layer" used herein refers to a stratum or sheet of a geometrical structure. Each layer may have three dimensions (e.g., height, width, and depth) and may cover some or all of a surface. For example, a layer may be a three-dimensional structure where two dimensions are greater than a third, such as a thin-film. Layers may include different elements, components, and/or materials. In some cases, one layer may be composed of two or more sublayers. In some of the appended figures, two dimensions of a three-dimensional layer are depicted for purposes of illustration. Those skilled in the art will, however, recognize that the layers are three-dimensional in nature.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:
   a processor,
   a capacitive touch screen coupled to the processor, the capacitive touch screen comprising a surface and a sensor grid underneath the surface, and
   memory coupled to the processor, the processor operably configured to:
      determine an image quality value associated with the sensor grid;
      determine whether a protective layer is in contact with the capacitive touch screen based at least in part on the determined image quality value associated with the sensor grid; and
      terminate a calibration operation based at least in part on the determination of whether the protective layer is in contact with the capacitive touch screen.

2. The apparatus of claim 1, wherein the processor is further operably configured to:
   perform a calibration based at least in part on the protective layer in contact with the capacitive touch screen, the calibration comprising adjusting one or more operating characteristics of the sensor grid.

3. The apparatus of claim 1, wherein the processor is further operably configured to:
   perform an auto-detection operation to detect whether the protective layer is in contact with the capacitive touch screen using the sensor grid, wherein the auto-detection operation is based at least in part on an internal input, an external input, or a combination thereof.

4. The apparatus of claim 1, wherein the processor is further operably configured to:
   retrieve, from the memory, a first set of sensor tuning offset values comprising one or more calibration values corresponding to the protective layer; and
   perform a first auto-calibration operation by applying the retrieved first set of sensor tuning offset values to the sensor grid.

5. The apparatus of claim 1, wherein the processor is further operably configured to:
   measure a mutual capacitance between a subset of conductive columns or a subset of conductive rows associated with the sensor grid;
   compare the measured mutual capacitance to a baseline mutual capacitance; and
   determine whether the protective layer is in contact with the capacitive touch screen based at least in part on the comparing.

6. The apparatus of claim 5, wherein the processor is further operably configured to:
   compare a baseline image associated with a mutual capacitance of the sensor grid lacking the protective layer on the surface of the capacitive touch screen and an image associated with the mutual capacitance of the sensor grid having the protective layer on the surface of the capacitive touch screen.

7. The apparatus of claim 4, wherein the processor is further operably configured to:
   retrieve, from the memory, a second set of sensor tuning offset values, wherein a sensor tuning offset value comprises a calibration value corresponding to the protective layer; and
   perform a second auto-calibration operation by applying the retrieved second set of sensor tuning offset values to the sensor grid,
   wherein to determine the image quality value is based at least in on the second auto-calibration operation.

8. The apparatus of claim 7, wherein the processor is further operably configured to:
   perform the second auto-calibration operation based at least in part on the image quality value satisfying an image quality threshold.

9. The apparatus of claim 7, wherein the processor is further operably configured to:
   confirm the calibration operation based at least in part on matching a first image and a second image of the sensor grid, wherein the image quality value satisfies an image quality threshold.

10. The apparatus of claim 9, wherein the first image comprises a regular version of an image and the second image comprises an inverted version of the image.

11. A method comprising:
    determining an image quality value associated with a sensor grid underneath a surface of a capacitive touch screen;
    determining whether a protective layer is in contact with the capacitive touch screen based at least in part on the determined image quality value associated with the sensor grid; and
    terminating a calibration operation based at least in part on the determination of whether the protective layer is in contact with the capacitive touch screen.

12. The method of claim 11, further comprising:
    performing a calibration based at least in part on the protective layer in contact with the capacitive touch screen, the calibration comprising adjusting one or more operating characteristics of the sensor grid.

13. The method of claim 11, further comprising:
    performing an auto-detection operation to detect whether the protective layer is in contact with the capacitive touch screen using the sensor grid, wherein the autodetection operation is based at least in part on an internal input, an external input, or a combination thereof.

14. The method of claim 11, further comprising:

retrieving a first set of sensor tuning offset values comprising one or more calibration values corresponding to the protective layer; and performing a first auto-calibration operation by applying the retrieved first set of sensor tuning offset values to the sensor grid.

15. The method of claim 11, further comprising:

measuring a mutual capacitance between a subset of conductive columns or a subset of conductive rows associated with the sensor grid;

comparing the measured mutual capacitance to a baseline mutual capacitance; and determining whether the protective layer is in contact with the capacitive touch screen based at least in part on the comparing.

16. The method of claim 15, further comprising:

comparing a baseline image associated with a mutual capacitance of the sensor grid lacking the protective layer on the surface of the capacitive touch screen and an image associated with the mutual capacitance of the sensor grid having the protective layer on the surface of the capacitive touch screen.

17. The method of claim 14, further comprising:

retrieving a second set of sensor tuning offset values, wherein a sensor tuning offset value comprises a calibration value corresponding to the protective layer; and performing a second auto-calibration operation by applying the retrieved second set of sensor tuning offset values to the sensor grid, wherein determining the image quality value is based at least in on the second auto-calibration operation.

18. The method of claim 17, further comprising:

performing the second auto-calibration operation based at least in part on the image quality value satisfying an image quality threshold.

19. The method of claim 17, further comprising:

confirming the calibration operation based at least in part on matching a first image and a second image of the sensor grid, wherein the image quality value satisfies an image quality threshold.

20. An apparatus, comprising:

means for determining an image quality value associated with a sensor grid underneath a surface of a capacitive touch screen;

means for determining whether a protective layer is in contact with the capacitive touch screen based at least in part on the determined image quality value associated with the sensor grid; and means for terminating a calibration operation based at least in part on the determination of whether the protective layer is in contact with the capacitive touch screen.

* * * * *